United States Patent [19]
Ohta et al.

[11] Patent Number: 5,192,420
[45] Date of Patent: Mar. 9, 1993

[54] VIBRATION DAMPER OBTAINED BY ADJUSTING THE RESIN AND AROMATIC COMPONENTS OF THE ASPHALT BASE

[75] Inventors: Humio Ohta, Hanazono; Tadahiko Matsumzawa, Yorii, both of Japan

[73] Assignee: Kabushiki Kaisha Asahi Corporation, Tokyo, Japan

[21] Appl. No.: 625,011

[22] Filed: Dec. 10, 1990

[51] Int. Cl.$^5$ .................................................. C10C 3/00
[52] U.S. Cl. ....................................... 208/23; 106/282
[58] Field of Search ............................ 208/23; 106/282

[56] References Cited
U.S. PATENT DOCUMENTS 4,966,929 10/1990 Tomoshige et al. ................. 524/71

Primary Examiner—Paul Lieberman
Assistant Examiner—Bradley A. Swope

[57] ABSTRACT

Disclosed herein is a vibration damper comprising 30–70 wt. % of a vibration damper base composed of approximately 30–38 wt. % of a resin component and approximately 55–65 wt. % of aromatic components and obtained either by adjusting the components contained in an asphalt base crude oil in the course of its refining or by blending and adjusting a resin component and aromatic component contained in petroleum asphalt, and 50–20 wt. % of an inorganic filler in the form of a thin flake of 20–200 mesh, the sum of said vibration damper base and filler being at least 80 wt. %. The vibration damper is suitable for installation on the floors of vehicles.

7 Claims, 4 Drawing Sheets

VIBRATION DAMPER OBTAINED BY ADJUSTING THE RESIN AND AROMATIC COMPONENTS OF THE ASPHALT BASE

BACKGROUND OF THE INVENTION

1) Field of the Invention

This invention relates to a vibration damper for damping the propagation of vibration through solid, which is caused by the vibration of steel panel sheets for vehicles such as cars, covers for machines, etc., and especially, to a vibration damper suitable for use in installing on the floors of vehicles.

2) Description of the Related Art

Vibration dampers of this kind have heretofore been formed of a sheet obtained by mixing an inorganic filler and reinforcing fibers into a base comprising a conventional asphalt, for example, single blown asphalt or straight asphalt, or a mixed asphalt thereof, and a modifier such as a synthetic rubber or an elastomer, which is mixed therewith, said sheet having a high specific gravity.

Such vibration dampers exhibit excellent vibration-damping effect at low temperatures. However, such vibration-damping effect becomes lower as the temperature rises.

Thus, when the temperature of a location wherein the vibration damper is utilized is 40° C. or higher at the time a vehicle is used, the vibration-damping effect is lowered.

For this reason, it is preferable that the vibration damper should be made thicker in order to enhance its vibration-damping properties. However, such a thicker vibration damper is not preferred because the weight of the vehicle is increased when it is installed on the floor of the vehicle. In addition, difficulties are also encountered with regard to the installation work. Accordingly, there is a limit even to the thickening of the vibration damper. This limit has involved a disadvantage in that it is impossible to sufficiently enhance the vibration-damping effect at 20°-60° C.

In addition, it has been known to incorporate a large amount of a filler in a vibration damper of this kind so as to improve its vibration-damping properties. This has been accompanied by a disadvantage that when such a vibration damper is installed on a vehicle floor made of a steel sheet, its adhesion properties to the steel sheet is deteriorated and reliable laying is hence infeasible unless an adhesive is used.

SUMMARY OF THE INVENTION

It is an object of this invention to provide a vibration damper permitting the solution of the above-described disadvantages of the prior art and exhibiting an excellent vibration-damping effect if it is thin.

Another object of this invention is to provide a vibration damper exhibiting an excellent vibration-damping effect over desired temperatures when it is used as a vibration damper for vehicles.

A further object of this invention is to provide a vibration damper easy to cause to adhere closely to an object to be applied, and also easy to handle owing to its light weight.

In order to achieve such objects, according to this invention, there is provided a vibration damper comprising 30-70 wt. % of a vibration damper base containing approximately 30-38 wt. % of a resin component and approximately 55-65 wt. % of an aromatic component and obtained either by adjusting the components contained in an asphalt base crude oil in the course of its refining or by blending and adjusting a resin component and aromatic component contained in petroleum asphalt, and 50-20 wt. % of an inorganic filler in the form of a thin flake of 20-200 mesh, the sum of said vibration damper base and filler being at least 80 wt. %.

Other objects and advantages of the present invention will be readily appreciated from the preferred embodiments of this invention, which will be described subsequently in detail with reference to the accompanying drawings.

BRIEF DESCRIPTION OF THE DRAWINGS

The drawings illustrate the effects exhibited by embodiments of this invention.

DETAILED DESCRIPTION OF THE INVENTION AND PREFERRED EMBODIMENTS

Figure 1:
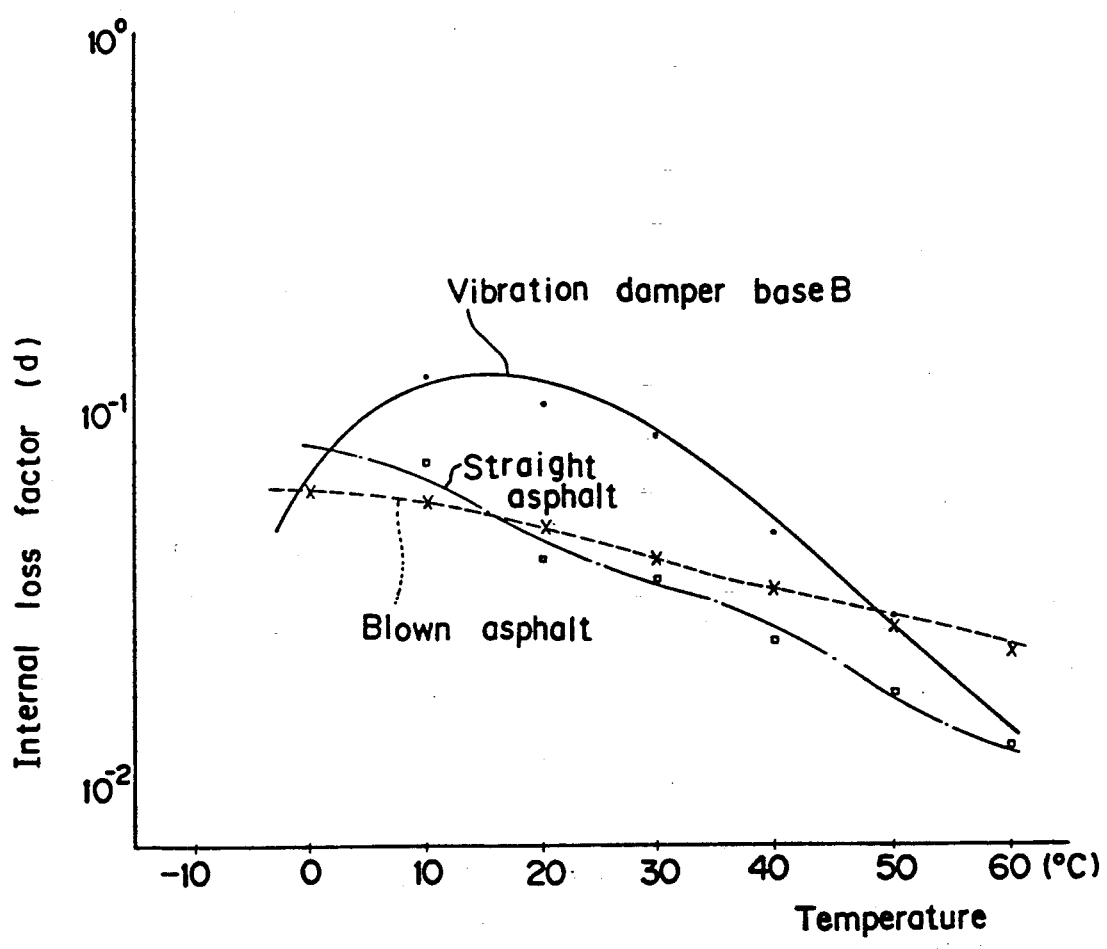
FIG. 1 diagrammatically illustrates the internal loss factors (inner Verlust) of a vibration damper base used in the Examples of this invention and internal loss factors of conventional vibration damper bases.

Features of the present invention will hereinafter be described in detail.

The vibration damper base according to this invention may be obtained by adjusting the components contained in an asphalt base crude oil in the course of its refining, but may also be obtained by blending the resin component and aromatic component in petroleum asphalt. Since this base contains greater amounts of the resin and aromatic components compared to the conventional blown asphalt or straight asphalt and the filler is contained therein in a larger amount compared to any conventional vibration dampers, the internal loss factor of the vibration damper is increased in comparison with those of the conventional vibration dampers.

Namely, the amounts of the resin and aromatic components contained in the vibration damper base used in this invention are 24-38 wt. % and 48-65 wt. %, respectively, of the whole weight of the base. With respect to various asphalts used conventionally on the other hand, for example, blown asphalt (10-20) contains 13-16 wt. % of the resin component and 33-35 wt. % of the aromatic component, and straight asphalt (60-80) contains 22-23 wt. % of the resin component and 44-46 wt. % of the aromatic component.

If the content of the resin component in the vibration damper base is less than 24 wt. %, its internal loss factor will be enhanced, but its Young's modulus will become too low and its form retention will hence be deteriorated. Any contents more than 38 wt. % will result in a vibration damper base not only having a increased Young's modulus and hence a reduced internal loss factor but also having high brittleness and deteriorated moldability or formability. It is therefore not preferable to contain the resin component in any amounts outside the above range.

If the content of the aromatic component in the vibration damper base is less than 48 wt. %, its Young's modulus will become higher and it will hence not be expected to enhance its internal loss factor. If the content is more than 65 wt. %, its internal lass factor will be enhanced, but oily components will become too great. Such a large amount of oily components are not preferred because they tend to leak out. In addition, the form retention will be deteriorated. Furthermore, when the base contains the aromatic component in such a large amount, a temperature at which the internal loss factor reaches a maximum value is lowered.

When the vibration damper base is obtained by the refining of an asphalt base crude oil, it contains an asphaltene component and a saturated component as inevitable components in addition to the resin and aromatic components. It is however desirable to minimize the content of the asphaltene component because when it is contained in a large amount, the Young's modulus of the base is increased and the enhancement of its internal loss factor is hence prevented. It is therefore desirable to control its content to 5-12 wt. % of the whole weight of the asphalt. On the other hand, when the saturated component increases in quantity, the Young's modulus is reduced and the internal loss factor is enhanced. However, since the form retention of the base is deteriorated, it is desirable to minimize its content. It is desirable to control its content to 5-12 wt. % of the whole weight of the asphalt. Further, when the saturated component increases in quantity, a temperature at which the internal loss factor reaches a maximum value is lowered.

The filler is preferably in the form of a thin flake like material which is conventionally known, such as, mica, graphite, clay, talc, etc. In particular, mica high in Young's modulus is most preferred. In order to enhance the internal loss factor, the filler preferably has a particle size of 20 mesh or larger. However, any fillers larger than 200 mesh will result in a vibration damper deteriorated in vibration-damping properties and are hence not preferred.

The vibration damper according to this invention is obtained by blending the filler into the base. In order to improve its form retention, it may contain nonasbestine organic fibers, for example, pulp fibers such as wastepaper as a fibrous component, as needed.

In the vibration damper of this invention, it cannot be expected to enhance its internal loss factor unless the vibration damper base is controlled to 30-70 wt. % of the whole weight of the vibration damper, the filler is adjusted to 50-20 wt. % of the whole weight and the sum of the vibration damper base and filler comprises at least 80 wt. %.

If the amount of the vibration damper base is less than 30 wt. %, the amount of the filler will be too great and a vibration damper, which is brittle and lowered in formability or moldability, will hence be brought about. On the other hand, any amounts exceeding 70 wt. % will result in a vibration damper deteriorated in internal loss factor because of correspondingly decreased filler. It is therefore not preferable to use the vibration damper base in any amounts outside the above range.

On the contrary, if the amount of the filler is increased to more than 50 wt. % of the whole weight of the vibration damper, any vibration damper having a further enhanced internal loss factor cannot be obtained and moreover its formability or moldability becomes deteriorated. It is hence not preferable to use the filler in such a large amount.

It is preferable to control the total amount of the asphalt and filler to at least 80% of the whole weight of the vibration damper, in particular, the vibration damper base and the filler to 45-60 wt. % and 50-25 wt. %, respectively.

As described above, a temperature at which the internal loss factor reaches a maximum value varies depending upon the content of the aromatic component in the vibration damper base. It is therefore possible to preset the temperature to a desired temperature by controlling its content. Besides, when a saturated component is contained in the vibration damper base, the temperature at which the internal loss factor reaches a maximum value varies depending upon its content as with the aromatic component. This temperature can therefore be preset to a desired temperature by controlling its content.

As will be described subsequently, when the vibration damper base is caused to foam, the temperature at which the internal loss factor reaches a maximum value becomes higher. The vibration damper base is therefore adjusted by controlling the content of the aromatic component or saturated component so as to give a maximum internal loss factor at a desired temperature.

The adjustment of the aromatic component or saturated component may be achieved by controlling the amount of such a component contained in an asphalt base crude oil in the course of its refining. However, it is also possible to adjust the component either by adding an oil containing a large amount of the aromatic component or saturated component or by adding straight asphalt containing a large amount of the aromatic component or blown asphalt containing a large amount of the saturated component.

The vibration damper according this invention contains the filler in an extremely high proportion compared with the conventional vibration dampers. Accordingly, it is uneven in surface and hence hard to become intimate with a steel sheet on which it is to be positioned, from a viewpoint of form. However, it is possible to position the vibration damper without hindrance by sticking it with an adhesive on the steel sheet.

In addition, the vibration damper of this invention can be caused to foam to give smooth surfaces. It hence becomes easy to become intimate with a steel sheet on which it is to be positioned, and is improved in adhesion properties. Such a damper can be caused to adhere to the steel sheet with ease by heating it upon its laying.

Upon the foaming, it is preferable to use a blowing agent and a foaming aid in amounts of 0.5-3% and 0.5-6%, respectively, of the whole weight of the vibration damper. Any proportions of the blowing agent lower than 0.5% will be too low to smooth the uneven surfaces of the damper to improve its adhesion properties. On the other hand, any proportions higher than 3% will result in a vibration damper containing cells which are too numerous. Such a vibration damper is undesirable to use as a laying sheet.

Moreover, when the vibration damper base is caused to foam, the temperature at which the internal loss factor reaches a maximum value becomes higher.

EXAMPLES

The present invention will hereinafter be described in further detail by the following preferred embodiments.

Compositions of vibration dampers described in Examples of this invention and Comparative Examples are as shown in Table 1, and the proportions of components in vibration damper base A-D, which were used in any one of the examples, are as shown in Table 2.

The internal loss factors of a vibration damper base used in the examples of this invention and conventional blown asphalt and straight asphalt were determined. The results are as illustrated in FIG. 1 wherein a base sheet of steel was used having a 0.8 mm thickness with a vibration damper having a 2.0 mm thickness. As apparent from FIG. 1, the internal loss factor of the vibration damper base according to this embodiment is more enhanced than those of the conventional asphalts.

Example 1 is indicative of an embodiment making use of an unfoamed vibration damper base, and the same applies to Comparative Examples 1 and 3. Other Examples and Comparative Example are indicative of embodiments making use of foamed vibration damper bases.

Examples 2-4 are indicative of embodiments making respective use of the vibration damper bases B-D, which are different in contents of both aromatic and saturated components from one another. Asphalt C contains a larger amount of the saturated component compared with Asphalt B, while Asphalt D contains a larger amount of the aromatic component compared with Asphalt B.

Example 5 is indicative of an embodiment making addition of a vinyl acetate block polymer as a modifier.

Example 6 is indicative of an embodiment in which Asphalt B was contained at its maximum.

Shown in Table 3, are the internal loss factors of the vibration dampers in individual Examples and Comparative Examples, as determined at 20° C., 40° C. and 60° C. when they are formed into sheets of 2.0 mm thick and the sheets are separately laid down on a steel sheet of 0.8 mm thick.

All the internal loss factor of the vibration dampers in the Examples are more enhanced than those in Comparative Examples. All of them exhibited internal loss factors superior to that of a vibration damper with a vinyl acetate block polymer, synthetic rubber and petroleum resin as modifiers added thereto as in Example 2.

Figure 2:
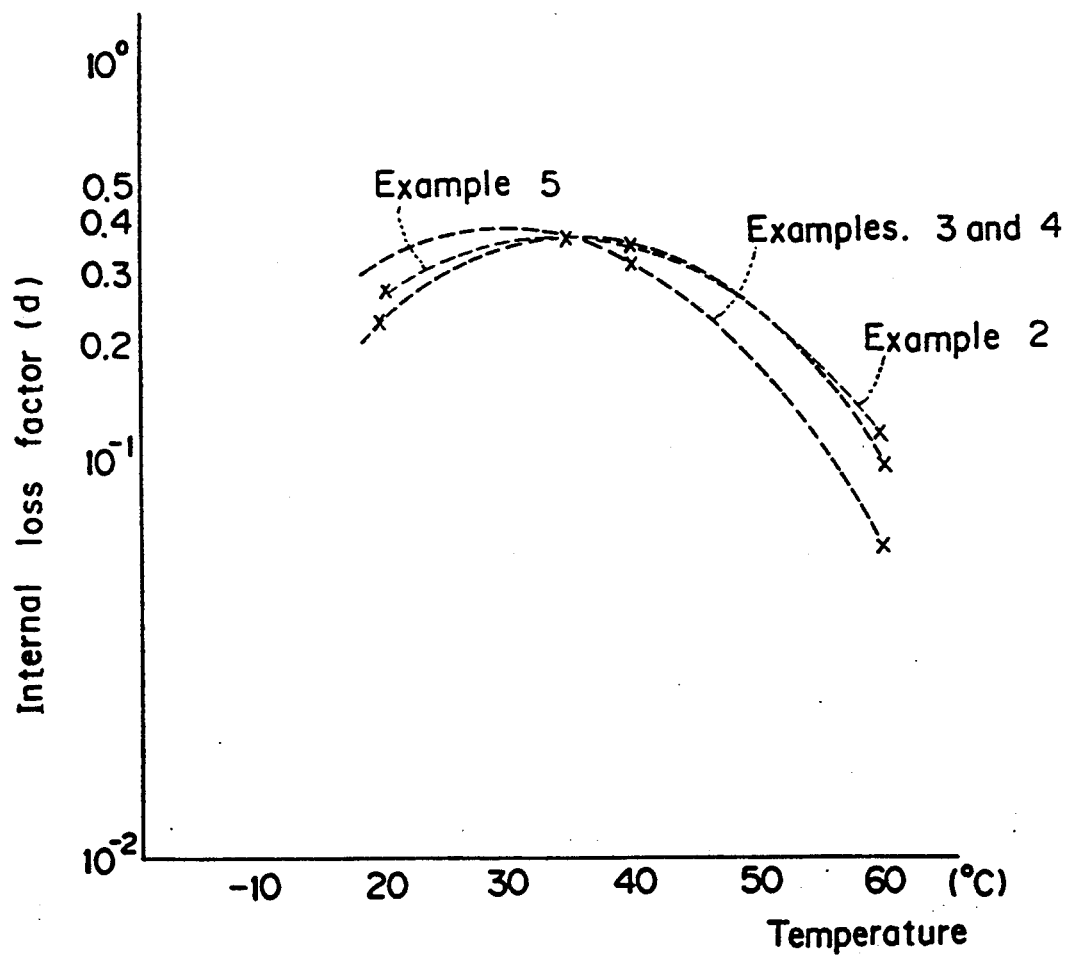
FIG. 2 diagrammatically illustrates the internal loss factors of vibration damper bases used in the Examples wherein the compositions of the bases were changed from one another.
Figure 3:
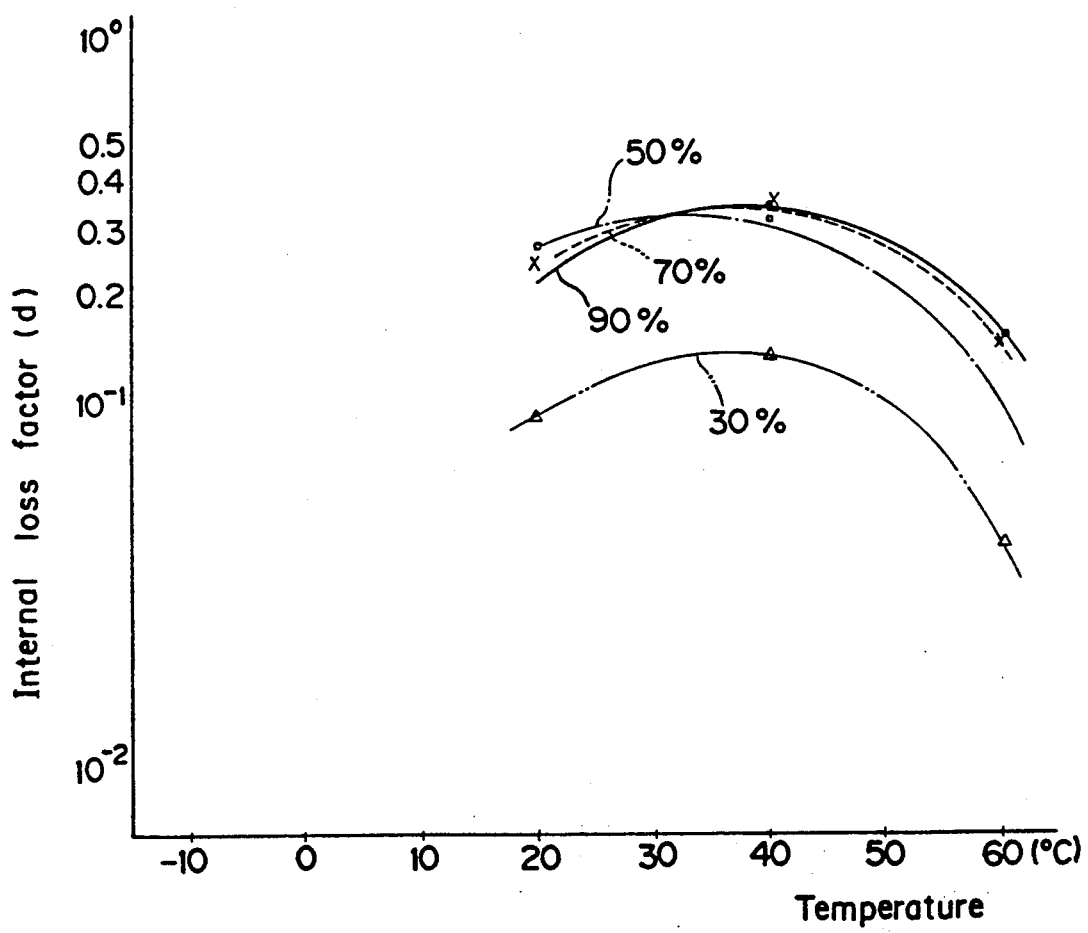
FIG. 3 diagrammatically illustrates the internal loss factors of vibration damper bases used in the Example wherein the contents of a filler were varied.
Figure 4:
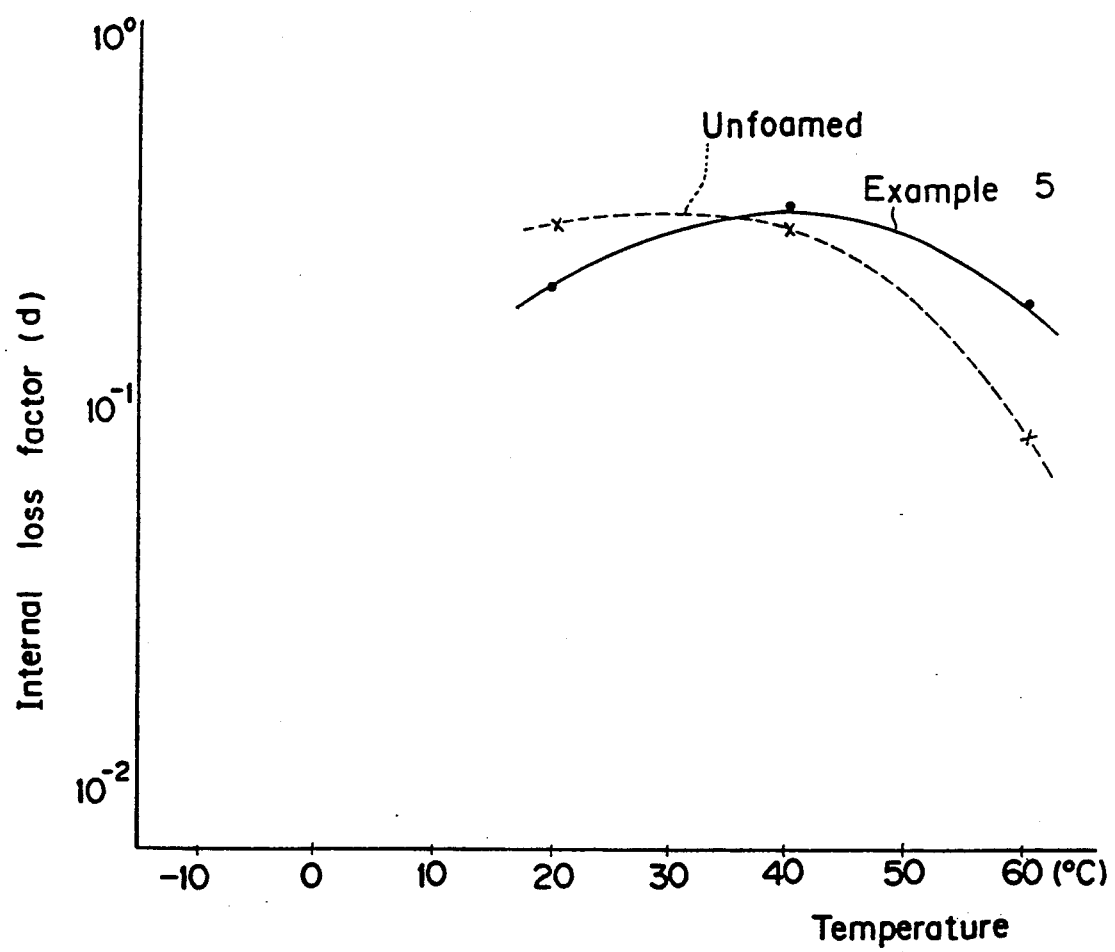
FIG. 4 is a diagram illustrating variations in internal loss factor between vibration dampers in foamed and unfoamed states.

The vibration damper in the unfoamed state in Example 1 exhibited the maximum internal loss factor at 20° C., wile the vibration damper in the foamed state in Example 2 exhibited the maximum internal loss factor at 40° C. and both vibration dampers in Examples 3 and 4, which made respective use of Asphalts C and D containing respectively larger amounts of the saturated component and the aromatic component compared with Asphalt B in Example 2, exhibited the maximum internal loss factor at 30° C. as illustrated in FIG. 2. In FIGS. 2, 3 and 4, a base sheet of steel was used having a 0.8 mm thickness with a vibration damper having a 2.0 mm thickness.

FIG. 3 diagrammatically illustrates the determination results of internal loss factors when the content of the filler in the vibration damper in Example 2 was changed to 30%, 50% 70% and 90%. It is understood therefrom that if the content is less than 30%, the internal loss factor is not enhanced compared with those of the conventional vibration dampers, and even if the content is more than 50%, the internal loss factor is not improved further.

The vibration damper in Example 5 was obtained by adding the vinyl acetate block polymer and the petroleum resin to the vibration damper base in Example 3 and reducing the amount of the filler corresponding. As shown in Table 3, it is understood that the internal loss factor at 60° C. is enhanced compared to that in Example 3.

FIG. 4 diagrammatically illustrates the comparison results of internal loss factors between the foamed vibration damper in Example 5 and its corresponding unfoamed product. It is appreciated that the temperature at which the foamed product of Example 5 exhibits the maximum internal loss factor is shifted to a high-temperature side against the unfoamed product.

Shown in Table 4, are internal loss factors as determined on various sheets of different thicknesses, which were obtained from the vibration dampers in Example 2 and Comparative Example 1.

As is apparent from the results shown in Table 4, it is understood that the vibration damper in Example 2 are enhanced in internal loss factor and low in specific gravity compared with the vibration damper in Comparative Example 1 under the same thickness.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 |
| --- | --- | --- | --- | --- | --- | --- | --- | --- | --- |
| Asphalt A |  |  |  |  |  |  | 51 | 45 | 50 |
| Asphalt B | 51 | 50 |  |  |  | 65 |  |  |  |
| Asphalt C |  |  | 50 |  | 51 |  |  |  |  |
| Asphalt D |  |  |  | 50 |  |  |  |  |  |
| Vinyl acetate block polymer |  |  |  |  | 3 |  |  | 5 |  |
| Synthetic rubber | 2 | 2 | 2 | 2 |  |  |  | 2 |  |
| Petroleum resin |  |  |  |  | 2 |  |  | 2 |  |
| Calcium carbonate |  |  |  |  |  |  | 28 |  | 41 |
| Clay |  |  |  |  |  |  |  | 20 |  |
| Mica | 43 | 43 | 43 | 43 | 38 | 30 | 9 | 15 |  |
| Nonasbestine fiber | 3 | 3 | 3 | 2 | 3 | 3 | 11 | 7 | 9 |
| D.P.T. |  | 0.5 | 0.5 | 0.5 | 1 | 0.5 |  | 2 |  |
| Urea compound |  | 0.5 | 0.5 | 0.5 | 1 | 0.5 |  | 2 |  |
| Calcium oxide | 1 | 1 | 1 | 1 | 1 | 1 | 1 |  |  |

TABLE 2

|  | Asphaltene component | Resin component | Saturated component | Aromatic component |
| --- | --- | --- | --- | --- |
| Asphalt A | 30.5 | 13.5 | 22.0 | 34.0 |
| Asphalt B | 7.5 | 30.3 | 7.2 | 55.0 |
| Asphalt C | 7.5 | 26.0 | 11.5 | 55.0 |
| Asphalt D | 7.5 | 24.3 | 7.2 | 61.0 |

TABLE 3

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| 20° C. | 0.40 | 0.33 | 0.30 | 0.30 | 0.30 | 0.25 | 0.14 | 0.20 | 0.08 |
| 40° C. | 0.32 | 0.35 | 0.30 | 0.30 | 0.36 | 0.22 | 0.09 | 0.14 | 0.04 |
| 60° C. | 0.10 | 0.15 | 0.06 | 0.06 | 0.18 | 0.06 | 0.05 | 0.08 | 0.02 |

TABLE 4

|  | 20° C. | 40° C. | 60° C. | Specific gravity |
|---|---|---|---|---|
| Example 2 | | | | |
| 2.0 mm | 0.33 | 0.35 | 0.15 | 2.7-2.8 kg/m$^3$ |
| 3.0 mm | 0.39 | 0.42 | 0.23 | 4.0-4.2 kg/m$^3$ |
| 4.0 mm | 0.45 | 0.48 | 0.29 | 5.1-5.6 kg/m$^3$ |
| Comp. Ex. 1 | | | | |
| 2.0 mm | 0.14 | 0.90 | 0.05 | 3.1-3.3 kg/m$^3$ |
| 3.0 mm | 0.27 | 0.22 | 0.17 | 4.7-4.9 kg/m$^3$ |
| 4.0 mm | 0.32 | 0.28 | 0.20 | 6.3-6.5 kg/m$^3$ |

Although the present invention has been described above with reference to the preferred embodiments thereof, it is to be understood that the invention is not limited thereto and that various modifications and changes in form and details can be made therein without departing from the spirit and scope of the invention.

What is claimed is:

1. A vibration damper comprising:
   30-70 wt. % of a vibration damper base containing approximately 30-38 wt. % of a resin component and approximately 55-65 wt. % of aromatic components and obtained either by adjusting the components contained in an asphalt base crude oil in the course of its refining or by blending and adjusting a resin component and aromatic component contained in petroleum asphalt; and
   50-20 wt. % of an inorganic filler in the form of a thin flake of 20-200 mesh,
   the sum of said vibration damper base and filler being at least 80 wt. %.

2. The vibration damper as claimed in claim 1, wherein when the vibration damper base contains, as inevitable components, an asphaltene component and a saturated component, both asphaltene component and saturated component are contained in amounts of 5-12 wt. %.

3. The vibration damper as claimed in claim 1, wherein the inorganic filler is mica.

4. The vibration damper as claimed in claim 1, which further contains organic fibers.

5. The vibration damper as claimed in claim 1, wherein the vibration damper base and the filler are contained in amounts 45-60 wt. % and 50-25 wt. %, respectively.

6. The vibration damper as claimed in claim 1, wherein the content of the aromatic component or saturated component contained in the vibration damper base is adjusted to control a temperature at which the vibration damper base exhibits a maximum internal loss factor.

7. The vibration damper as claimed in claim 1, which has been caused to foam with a blowing agent and a foaming aid in amounts of 0.5-3 wt. % and 0.5-6 wt. %, respectively, of the whole weight of the vibration damper.

* * * * *